3,481,220
GEARING FOR A UNITARY STARTER-ALTERNATOR WITH VARIABLE RATIO CHARACTERISTICS
Robert E. Kaptur, Birmingham, Mich., assignor to Ford Motor Company, Dearborn, Mich., a corporation of Delaware
Filed May 10, 1968, Ser. No. 728,237
Int. Cl. F16h 5/60, 37/06
U.S. Cl. 74—675                    7 Claims

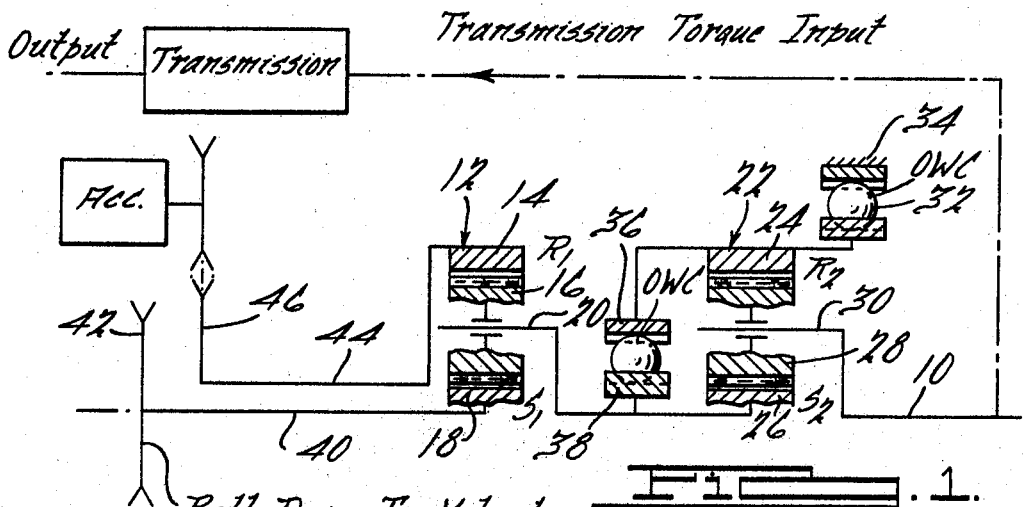
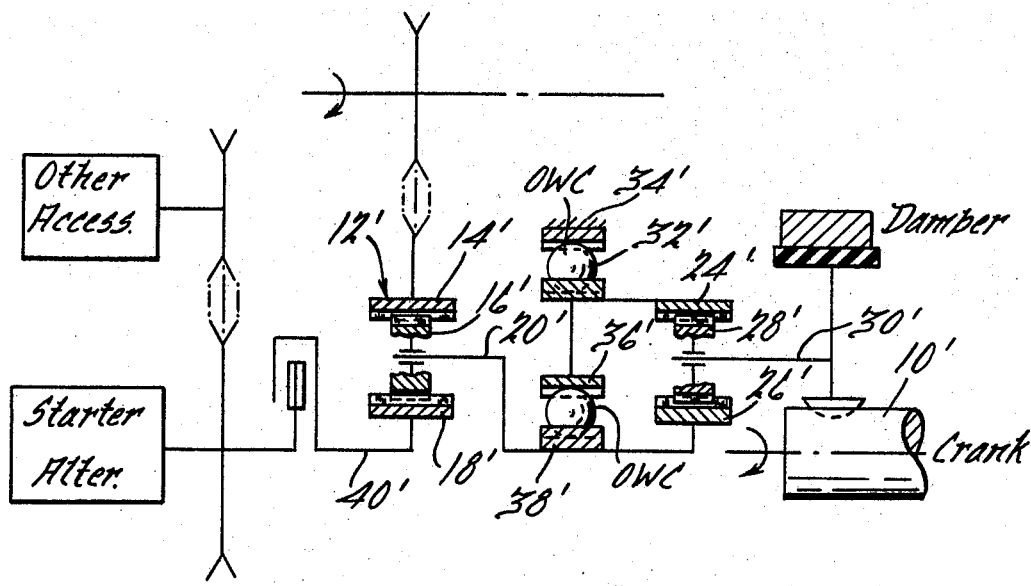

ABSTRACT OF THE DISCLOSURE

This specification discloses a planetary gear system in an automotive vehicle that establishes a bidirectional torque delivery path between the crankshaft of an internal combustion engine for the vehicle and engine driven accessories including a combined starter-alternator unit.

The gear system delivers torque from the starter-alternator unit to the engine crankshaft during cranking of the engine. When the engine fires, torque reversal occurs and the starter-alternator unit thereafter functions as an alternator rather than as a starter motor. The engine forms a part of an automotive vehicle driveline.

Brief summary of the invention

My invention is adapted especially to be used in an environment such as that shown in U.S. Patent No. 3,270,-207, which is assigned to the assignee of my invention. The patented construction includes a unitary starter-alternator mechanism for use with an internal combustion engine and a switching circuit for interchanging the compound field winding to condition the mechanism for operation in either an alternator mode or a motor mode. The switching circuit responds to changes in the direction of the torque reaction for the gearing that connects drivably the engine crankshaft to the armature of the starter-alternator mechanism.

A simple planetary gear arrangement in my improved construction is capable of providing a relatively high torque ratio between the starter-alternator mechanism and the engine when the starter-alternator mechanism functions as a starter motor. It is capable of providing a different ratio of lesser torque multiplication when the engine fires and the starter-alternator mechanism is driven by the engine as the function of the latter is changed. The transition occurs without the necessity for using friction torque establishing devices. The torque reaction during the engine starter operating mode is distributed to the transmission case, and the torque load on the starter-alternator accessory belt drive is reduced.

When the starter-alternator is functioning as an alternator, provision is made for varying the driven speed as the vehicle speed increases. In this way a higher driven speed at idle is available, although the driven speed at high vehicle speeds is not unnecessarily high. In this way power is conserved and wear on the starter-alternator unit due to excessive speeds is avoided.

Brief description of the drawing

FIGURE 1 shows in schematic form a planetary gear arrangement which establishes a torque delivery path between the starter-alternator mechanism and the engine. It includes a belt drive to the vehicle power transmission output shaft and a belt drive to the various engine accessories, which includes a starter-alternator mechanism.

FIGURE 2 shows a modification of the mechanism of FIGURE 1, including a crankshaft vibration damper.

Particular description of the invention

In the drawings, numeral 10 designates the crankshaft of an internal combustion engine in an automotive vehicle driveline. A first planetary gear unit 12 situated in the accessory driveline includes a ring gear 14, planet pinions 16, sun gear 18 and a planetary carrier 20. The pinions 16 are journalled rotatably on the carrier 20, and they engage drivably the ring gear 14 and sun gear 18.

A second simple planetary gear unit 22 in the accessory driveline includes a ring gear 24, a sun gear 26, planet pinions 28 and a planetary carrier 30. Pinions 28 are journalled rotatably on the carrier 30 and they are situated in driving engagement with the ring gear 24 and the sun gear 26. Carrier 30 is drivably connected to the crankshaft 10 as indicated.

A first overrunning brake 32 is located between the ring gear 24 and the transmission casing shown in part at 34. A one-way clutch 36 is situated between the ring gear 24 and the sun gear 26. Clutch 36 will permit sun gear 26 to be overspeeded in the direction of rotation of the crankshaft 10, but it will prevent ring gear 24 from overspeeding the sun gear 26.

Sun gear 26 is connected to the carrier 20 through a torque transfer shaft 38. Sun gear 18 of the simple planetary gear unit 12 is connected by means of torque transfer shaft 40 to a drive pulley 42. This pulley 42 is drivably connected to a companion pulley carried by the transmission output shaft, and the pulleys are connected together by a flexible drive belt.

Ring gear 14 is connected to sleeve shaft 44. An accessory drive pulley 46 is connected drivably to the shaft 44. The engine accessories, such as the starter-alternator unit described in Patent No. 3,270,207, and the engine coolant pump can be driven by the belt drive shown in part at 46.

When it is desired to crank the engine during starting, the driving torque of the alternator unit is delivered through the pulley drive 46 and the shaft 44 to the ring gear 14. The sun gear 18 acts as a reaction member at this time since it is connected to the output shaft of the transmission, which is drivably coupled to the traction wheels of the vehicle.

The carrier torque in carrier 20 is distributed to sun gear 26. Ring gear 24 at this time is anchored to the case through overrunning brake 32. Carrier 30 is driven at a reduced speed ratio as the overrunning clutch 36 freewheels. The crankshaft 10 then is driven by the output carrier 30.

The over-all torque ratio during operation in the starter mode is expressed as follows:

$$Te/Ta = (1 + S_1/R_1)(1 + R_2/S_2)$$

where $Te$ = engine torque
$Ta$ = alternator torque

When the engine fires, a torque reversal occurs in the gearing. The engine now is capable of powering the accessories rather than vice versa. Under these conditions carrier 30 becomes a power input member and the ring gear 24 becomes clutched to the sun gear 26 through the one-way clutch 36. The shaft 38 now is driven by crankshaft 10 at a 1:1 speed ratio as the planetary gear unit 22 becomes locked up. Ring gear 14, however, is overspeeded with respect to the shaft 38 as the sun gear 18 continues to act as a reaction member. The accessories then are driven at an overdrive speed ratio when the vehicle is stalled and acceleration is begun from a standing start. It is at this time when the maximum accessory speed is desired.

As the vehicle accelerates, sun gear 18 is driven in the same direction of rotation as the direction of rotation of carrier 20. Thus, the effective output speed of the ring gear 14 is reduced. The effective accessory speed then is dependent upon the vehicle speed as well as the engine speed. As the vehicle speed increases the accessory speed decreases. The accessory speed is sufficient, however, to maintain adequate power for the ignition system and to maintain adequate cooling during high speed operation.

The effective torque ratio for the gear system during the alternator drive mode is expressed as follows:

$$Ta/Te = \frac{1}{(1+S_1/R_1)}$$

During operation in the starter mode, the major percentage of the torque is distributed to the case through the brake 32 when compared to the amount of torque reaction accommodated by the sun gear 18, the latter torque being distributed through the output shaft belt drive shown in part at 42.

I have shown in the modification of FIGURE 2 a similar accessory drive with a crankshaft damper added. This includes an inertia mass in the form of a ring that is connected to the crankshaft 10' through a rubber connection. The elements of the FIGURE 2 construction that have counterparts in FIGURE 1 have been identified by similar reference characters, although prime notations are added.

The starter-alternator unit of FIGURE 2 is clutched through a relatively engageable friction clutch to sun gear 18', and the transmission output shaft is drivably connected to the ring gear 14'. This driving arrangement is the converse of the FIGURE 1 construction.

Having described my invention, what I claim and desire to secure by U.S. Letters Patent is:

1. An accessory drive mechanism for connecting drivably the crankshaft of an internal combustion engine to the armature of an electric power accessory unit for the engine comprising a pair of simple planetary gear units, said engine forming a torque delivery vehicle driveline that includes also a power transmission mechanism, said transmission mechanism establishing in part a torque delivery path between the engine and a driven shaft, each gear unit comprising a ring gear element, a sun gear element, a carrier element and planet pinions rotatably carried on said carrier element in meshing engagement with said sun and ring gear elements, said crankshaft being connected to a first element of a first of said gear units, overrunning brake means for establishing a one-way torque delivery path between a second element of said first gear unit and a stationary portion of said mechanism, one-way clutch means for connecting together two elements of said first planetary gear unit when one of said two elements tends to overspeed the other one in one direction although freewheeling motion therebetween is permitted in the other direction, a third element of said first gear unit being connected to a first element of said second gear unit, a second element of said second gear unit being connected drivably to said accessory unit, and a third element of said second gear unit being connected drivably to said power output shaft.

2. The combination as set forth in claim 1 wherein said engine crankshaft is connected to the carrier element of said first gear unit, the ring gear element of said first gear unit being anchored by said overrunning brake against said stationary portion, the sun gear of said first gear unit being connected to the carrier element of said second gear unit, the ring gear element of said second gear unit being connected drivably to said accessory unit and the sun gear element of said second gear unit being connected drivably to said driven shaft.

3. The combination as set forth in claim 1 wherein the driving connection between said accessory unit and said second gear unit includes driving and driven pulleys with a belt drivably connecting said pulleys, and a driving connection between said output shaft and said second gear unit comprising driving and driven pulleys with a driving belt situated therebetween.

4. The combination as set forth in claim 1 wherein said crankshaft is connected to the carrier element of said first gear unit, the ring gear element of said first gear unit being anchored by said overrunning brake against said stationary portion, the sun gear element of said first gear unit being connected to the carrier element of said second gear unit, the ring gear element of said second gear unit being connected drivably to said driven shaft and means for connecting the sun gear element of said second gear unit drivably to said accessory unit.

5. The combination as set forth in claim 2 wherein the ring gear element of said first gear unit and the sun gear element of said first gear unit are connected together through said one-way clutch means, said one-way clutch means permitting relative motion of the sun gear element of said first gear unit with respect to the ring gear element of said first gear unit in the direction of rotation of said crankshaft but inhibiting relative rotation therebetween in the opposite direction.

6. The combination as set forth in claim 2 wherein the driving connection between said accessory unit and said second gear unit includes driving and driven pulleys with a belt drivably connecting said pulleys, and a driving connection between said output shaft and said second gear unit comprising driving and driven pulleys with a driving belt situated therebetween.

7. The combination as set forth in claim 5 wherein the driving connection between said accessory unit and said second gear unit includes driving and driven pulleys with a belt drivably connecting said pulleys, and a driving connection between said output shaft and said second gear unit comprising driving and driven pulleys with a driving belt situated therebetween.

References Cited

UNITED STATES PATENTS

| 2,908,189 | 10/1959 | Parker et al. | 74—675 |
| 2,972,911 | 2/1961 | Volk et al. | 74—810 |
| 3,307,426 | 3/1967 | Whitaker | 74—675 |
| 3,361,010 | 1/1968 | Miller | 74—810 |
| 3,362,256 | 1/1968 | Cluff et al. | 74—675 |
| 3,416,308 | 12/1968 | Livezey | 74—675 |

ARTHUR T. McKEON, Primary Examiner

U.S. Cl. X.R.

74—810